Nov. 2, 1948.   D. M. SPEAKER ET AL   2,452,799
APPARATUS FOR AND METHOD OF MEASURING OR INDICATING
LIMB OR DIGITAL VOLUME CHANGES RESULTING
FROM ARTERIAL PULSATIONS
Filed April 3, 1947

INVENTORS
DAVID M. SPEAKER.
JOSEPH B. HERSH.
BY
John W. Hoag
ATTORNEY

Patented Nov. 2, 1948

2,452,799

UNITED STATES PATENT OFFICE 2,452,799

APPARATUS FOR AND METHOD OF MEASURING OR INDICATING LIMB OR DIGITAL VOLUME CHANGES RESULTING FROM ARTERIAL PULSATIONS

David M. Speaker, East Orange, N. J., and Joseph B. Hersh, Flushing, N. Y.

Application April 3, 1947, Serial No. 739,204

5 Claims. (Cl. 128—2.1)

This invention relates to method and apparatus for measuring or indicating limb or digital volume changes resulting from arterial pulsations. More particularly it relates to such a device in which a capacitative electro-static pressure conversion element comprising two members one of which is movable relative to the other is employed to transform pressure variations resulting from said arterial pulsations into electrical impulses by which an indicating instrument is actuated.

An object of the invention is to provide a simple and practical method and apparatus of the above described kind.

Another object of the invention is to provide a device of the above described kind which will be durable and dependable.

Another object of the invention is to provide a device of the above mentioned kind the sensitivity of which may be controlled to adapt it for use with either a limb cuff or a digital cuff.

Another object of the invention is to provide such a device with an improved limb cuff.

Another object of the invention is to provide such a device with an improved digital cuff means.

Another object of the invention is to provide an improved device of the above mentioned kind.

Other objects of the invention will be in part obvious or in part pointed out hereinafter.

The invention accordingly consists in the features of construction, combinations of elements, arrangement of parts, and in the several steps and relation and order of each of said steps to one or more of the others thereof, all as will be pointed out in the following description, and the scope of the application of which will be indicated in the following claims.

Figure 1:
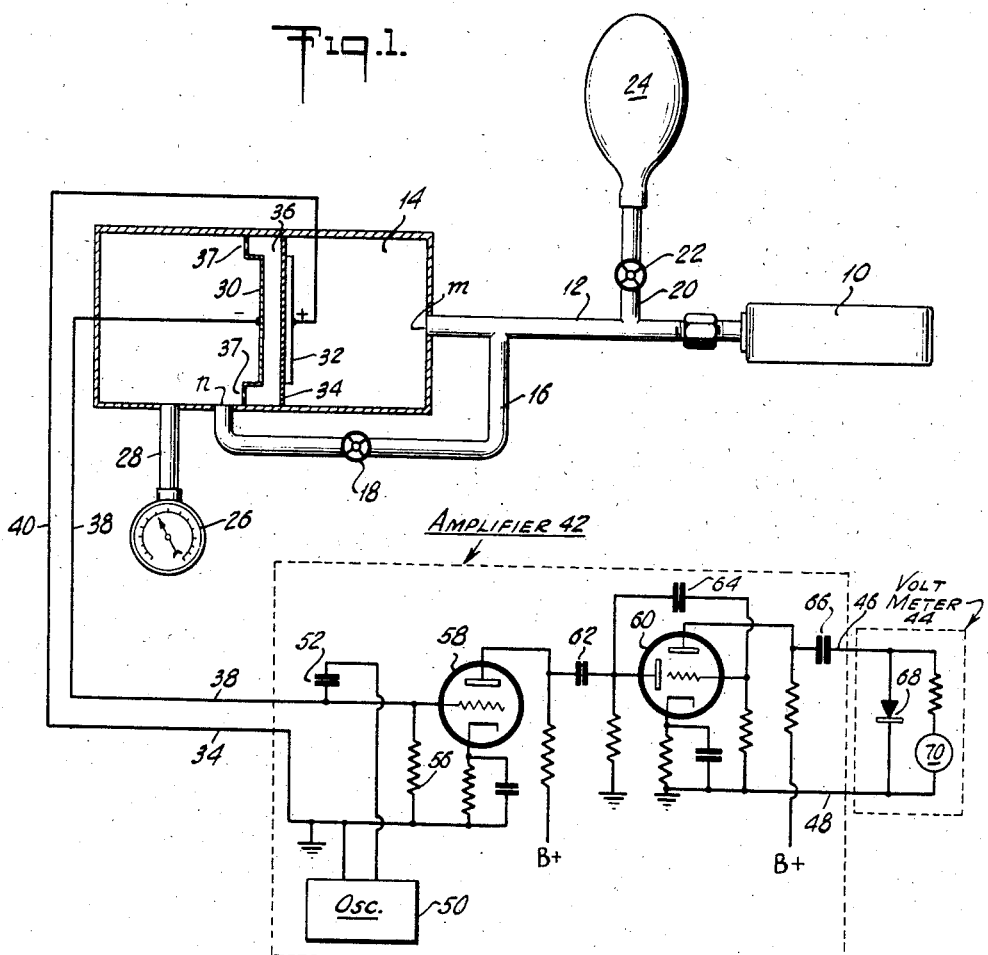
Figure 3:
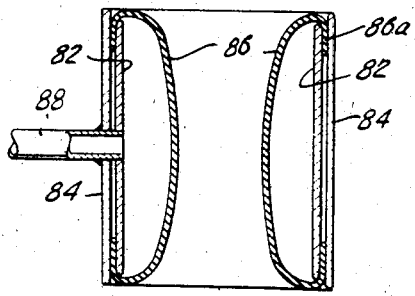
Figure 2:
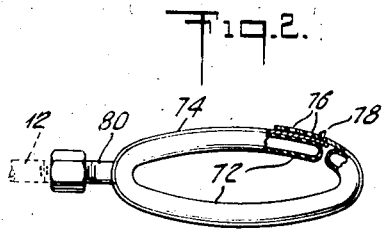

This invention will best be understood if the following description is read in connection with the drawings, in which, Figure 1 is a schematic diagram illustrating a measuring or indicating device embodying my invention;

Figure 2 is a perspective view partly broken away and partly in cross section of a limb cuff which may comprise one element of the assembly shown in Figure 1; and Figure 3 is a cross sectional view of a digital cuff.

In the drawings the numeral 10 designates a patient's cuff, which may be either a limb or a digital cuff, into which a patient's arm or leg or one of his fingers or toes may be inserted. The cuff is so constructed that even small variations in the volume of the limb or digit confined therein will be effectively transmitted as pressure changes through a fluid column and employed as will be described.

Cuff 10 communicates with an air-tight chamber 14 in two places, both directly through tubing 12 which opens into chamber 14 at m and through the branch 16, which has therein a valve 18, and opens into chamber 14 at n, on the opposite side from m of means for transforming pressure changes into capacitance changes, which will be described. Tubing 12 is also connected by tubing 20 through valve 22 with an air pump or air bulb 24. When air is pumped into tubing 20 from the pump or bulb 24 it increases the pressure within cuff 10 which is thereby expanded and presses more firmly against the portion of the body being tested with the result that arterial pulsations occurring within that portion of the patient's body will be transmitted from the cuff through the air column in tubing 12 and into chamber 14 both at m and n. The amount of pressure in chamber 14, which while valve 18 remains open will be balanced and equal on both sides of the capacitative electro-static pressure conversion element employed therein and which will now be described, may be measured by the pressure gauge 26 connected with chamber 14 by tubing 28.

Within chamber 14 is a fixed plate 30 and a plate 32 which is movable toward and away from plate 30 in response to variations of the fluid pressure transmitted through tubing 12. Movable plate 32 may be mounted within chamber 14 and controlled in various ways, but in the embodiment of the invention illustrated herein plate 32 is mounted on a flexible diaphragm 34 which is capable of movement toward or away from stationary plate 30. Between plates 30 and 32 an insulating dielectric medium 36 is provided which may be of any suitable kind and desirably is a layer of air.

Diaphragm 34 extends entirely across chamber 14 effectively separating it into a plurality of portions. Thus diaphragm 34 will move when there is a pressure differential between the two portions of the chamber. Stationary plate 30 is provided with the air ports 37 so that pressure on both sides of plate 30 will be equal at all times.

It will be understood that when valves 18 and 22 are closed changes in pressure in the air column in tube 12 resulting from arterial pulsations in the portion of the patient's body confined by the cuff 10 will be transmitted only through port m thereby causing excursions of movable plate 32 toward and away from stationary plate 30.

The resulting variations in the distance between plates 30 and 32 will occasion capacitance changes between the plates, the capacitance varying in accordance with the amplitude and frequency of the arterial pulsations. Plates 30 and 32 are connected to an indicating instrument circuit adapted to indicate these variations and preferably to render them readily observable to the operator.

In the preferred embodiment of the invention the circuit may comprise an amplifier 42 to which plates 30 and 32 are connected by input conductors 38 and 40, respectively, and a meter, such as voltmeter 44, connected to the output terminals thereof by conductors 46 and 48. Amplifier 42 may preferably have associated with it a source of high frequency current such as local oscillation circuit 50 connected through fixed capacitator 52 to conductor 38, the other side of the oscillator circuit being connected to conductor 40. Circuit 50 is capable of generating high frequency oscillations, for example, at a frequency of a few hundred kilocycles per second, in a well-known manner. These oscillations are applied across input circuit 38, 40. Capacitance 52 is small in value compared with the capacitance between plates 30 and 32 so that, in effect the oscillator provides a substantially constant current source of high frequency across the input circuit.

The input circuit 38, 40 is coupled to the input of amplifier tube 58. Resistance 56 serves as a direct current ground return for the grid of tube 58. The high frequency current from the oscillator will pass through the capacitance 52 and the capacitance formed by plates 30 and 32. When plates 30 and 32 are close together their reactance will be at a minimum and there will be a minimum voltage across them. When the plates travel farther apart, however, in response to the arterial pulsations, their capacitance decreases and a larger voltage drop occurs across them. Hence a variation is produced in the amplitude of the high frequency signal which is applied to the grid of tube 58. This modulated signal is amplified by tube 58, and the output signal from this tube, or amplifier stage, comprising the high frequency oscillations having amplitude fluctuations corresponding to the arterial pulsations superimposed thereon, is fed to a rectifier. While any suitable rectifier may be used the embodiment illustrated comprises the rectifier stage of diode-triode rectifier-amplifier tube 60 which is coupled to the output circuit of amplifier stage 58 by capacitance 62. The rectifier stage is coupled to the input grid of the amplifier stage of tube 60 by capacitance 64 and applies to the grid a rectified signal comprising a D. C. potential which varies in value and frequency in accordance with the amplitude and frequency of the arterial pulsations. This signal, amplified by the amplifier stage of tube 60 is fed to the indicating device 44.

The indicating device 44 may comprise a rectifying voltmeter coupled to the output circuit of the amplifier by capacitance 66 connected in conductor 46. The signal fluctuations applied to the voltmeter through conductors 46 and 48 pass primarily through rectifier 68 of the voltmeter circuit when the signal current is in one direction and through indicating meter 70, which may comprise a galvanometer-type winding controlling an indicating pointer on a dial, when the current is in the reverse direction. The excursions of the pointer will then correspond substantially with the arterial pulsations in amplitude and frequency.

While, a preferred amplifier and indicator circuit has been described which is especially well adapted to full realization of the advantages of the above described capacitative means of detecting arterial pulsations and limb or digital volume changes, it is contemplated that other suitable indicating circuits may likewise be used, with or without amplifying means and with or without the use of a high frequency source of oscillations. It is also contemplated that the indicating device may be any of a variety of visual or audible indicators or electrical variations and may include recording means, such as an ink or photostatic recorder to render the indications permanent, and also may include means for quantitatively measuring the amplitude and frequency of the variations, such as a calibrated scale, a calibrated recording chart or the like.

The cuff shown in Figure 2, and which may desirably be employed as an element of the assembly described above, differs from the conventional cuff which is wrapped around the patient's arm or leg in that it is a substantially cylindrical member or sleeve comprising an inner inflatable bag 72 which may for example be of rubber or the like and a surrounding flexible but unstretchable covering member 74, which is adapted to be wrapped together once around the patient's leg or arm and to be adjusted in diameter so as to cause the bag 72 when inflated to press forcibly against the leg or arm being tested. Member 74 may have a series of slots 76 adjacent one extremity and at its other extremity a number of cooperating means such as key 78, which may be selectively engaged in one of said slots to fit the cuff snugly around the patient's limb. The member 74 may for example be of metal of a thickness on the order o. one five-thousandths of an inch. Air may be introduced into the cuff through tubing 80. The bag 72 may be secured to the inner surface of the covering member 74, at one or more points, as by cement. Since in use the bag is confined inside member 74 it will expand toward the patient's leg or arm as the case may be, thus effectively exerting pressure against the arm or leg with the result that changes in volume thereof due to arterial pulsations will be effectively transmitted from the cuff to the air column in tubing 12.

In Figure 3 is shown a cuff adapted to receive a patient's finger or toe. This cuff comprises inner and outer inflexible tubular members 82 and 84 concentrically disposed but of sufficiently different diameters to receive between them the bent over end portion 86ª of a flexible tubing 86 the body of which extends through said member 82. Air may be admitted into the space between the tubing 86 and the inner tubular member 82, through tubing 88.

It will be understood that for measuring tissue volume changes responsive to arterial pulsations of a patient's finger or toe a cuff such as is shown in Figure 3 may be employed as the member 10 in the assembly illustrated in Figure 1 hereof.

The devices shown in Figures 2 and 3 have the advantage of confining the pressure responsive fluid medium of the cuff in a direction away from the patient thus causing the fluid to be in firm contact with the patient's arm, leg, finger or toe whereby even very small changes in the volume thereof serve to effect pressure changes in the air column in tubing 12 and can thus be effectively employed in controlling the position of plate 32 in relation to plate 30.

The assembly described herein has the advantages that with it an indicating instrument reading may be obtained starting from zero and the operator does not need to perform a subtraction operation to obtain a reading. The apparatus employed also has the advantages of dependability and durability and its operation is not affected by conditions of temperature, which, for example, would affect unfavorably piezo-electric crystals, the use of which for transforming pulse induced pressure variations into electrical impulses has heretofore been suggested. The means disclosed herein has the further advantage of controlled sensitivity whereby it is well adapted for application to fingers and toes as well as to arms and legs.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What we claim is:

1. Apparatus for measuring or indicating limb or digital volume changes resulting from arterial pulsations which comprises, a capacitative electro-static pressure conversion element comprising two members, one of which is movable relative to the other, connected to an electronic circuit responsive to said capacitance variations, means for applying balanced static fluid pressure to both sides of both members of said element, means for applying fluid pressure means to a limb or digit, and means for transmitting variations in the pressure of said fluid pressure means induced by volume changes resulting from arterial pulsations to one side only of the movable member of said element to change the capacitance of said element.

2. Apparatus for measuring or indicating limb or digital volume changes resulting from arterial pulsations which comprises a capacitative electro-static pressure conversion element comprising two members, one of which is movable relative to the other, connected to an electronic circuit responsive to said capacitance variations, and means responsive to volume changes of said limb or digit for changing the relative position of said members to change the capacitance of said element, said circuit including indicating means for measuring the electrical impulses set up in said circuit due to changes in the capacitance of said element.

3. The method of measuring or indicating limb or digital tissue volume changes resulting from arterial pulsations which comprises connecting in an electric circuit a capacitance electro-static pressure conversion element comprising two members one of which is movable relatively to the other, and interconnecting said limb or digit and said movable member with a fluid column to vary the position of said movable member in response to variations in the volume of said limb or digit.

4. Apparatus for measuring or indicating limb or digital volume changes resulting from arterial pulsations which comprises, a capacitative electro-static pressure conversion element comprising a pair of spaced conductive plates one of which is movable toward and away from the other, means for applying balanced static fluid pressure to both sides of both of said plates, means for applying fluid pressure means to a limb or digit, and means for transmitting variations in the pressure of said fluid pressure means induced by volume changes resulting from arterial pulsations to one side only of said movable plate to vary the spacing of said plates, a source of high frequency current and an amplifier fed thereby, and an indicating device fed by said amplifier said plates being connected to said high frequency source to modulate the current from said source fed to said amplifier.

5. Apparatus for measuring or indicating limb or digital volume changes resulting from arterial pulsations which comprises, a capacitative electro-static pressure conversion element comprising a pair of spaced conductive plates one of which is movable toward and away from the other, means for applying balanced static fluid pressure to both sides of both of said plates, means for applying fluid pressure means to a limb or digit, and means for transmitting variations in the pressure of said fluid pressure means induced by volume changes resulting from arterial pulsations to one side only of said movable plate to vary the spacing of said plates, a source of substantially constant high frequency current, an amplifier having an input circuit fed thereby, a rectifier fed by said amplifier and an indicating device circuit fed by said rectifier, said plates being connected across said high frequency source, thereby to provide a variable impedance by-pass across the input circuit of said amplifier.

DAVID M. SPEAKER.
JOSEPH B. HERSH.

REFERENCES CITED

The following references are of record in the file of this patent:

UNITED STATES PATENTS

| Number | Name | Date |
| --- | --- | --- |
| 2,031,870 | Vertuno | Feb. 25, 1936 |
| 2,045,750 | Buschenfeldt | June 30, 1936 |
| 2,139,509 | Marcellus | Dec. 6, 1938 |
| 2,235,894 | Lee | Mar. 25, 1941 |